Nov. 11, 1947.  H. W. ROCKWELL  2,430,618
FAIRLEAD CONSTRUCTION
Original Filed Jan. 20, 1945   2 Sheets-Sheet 1
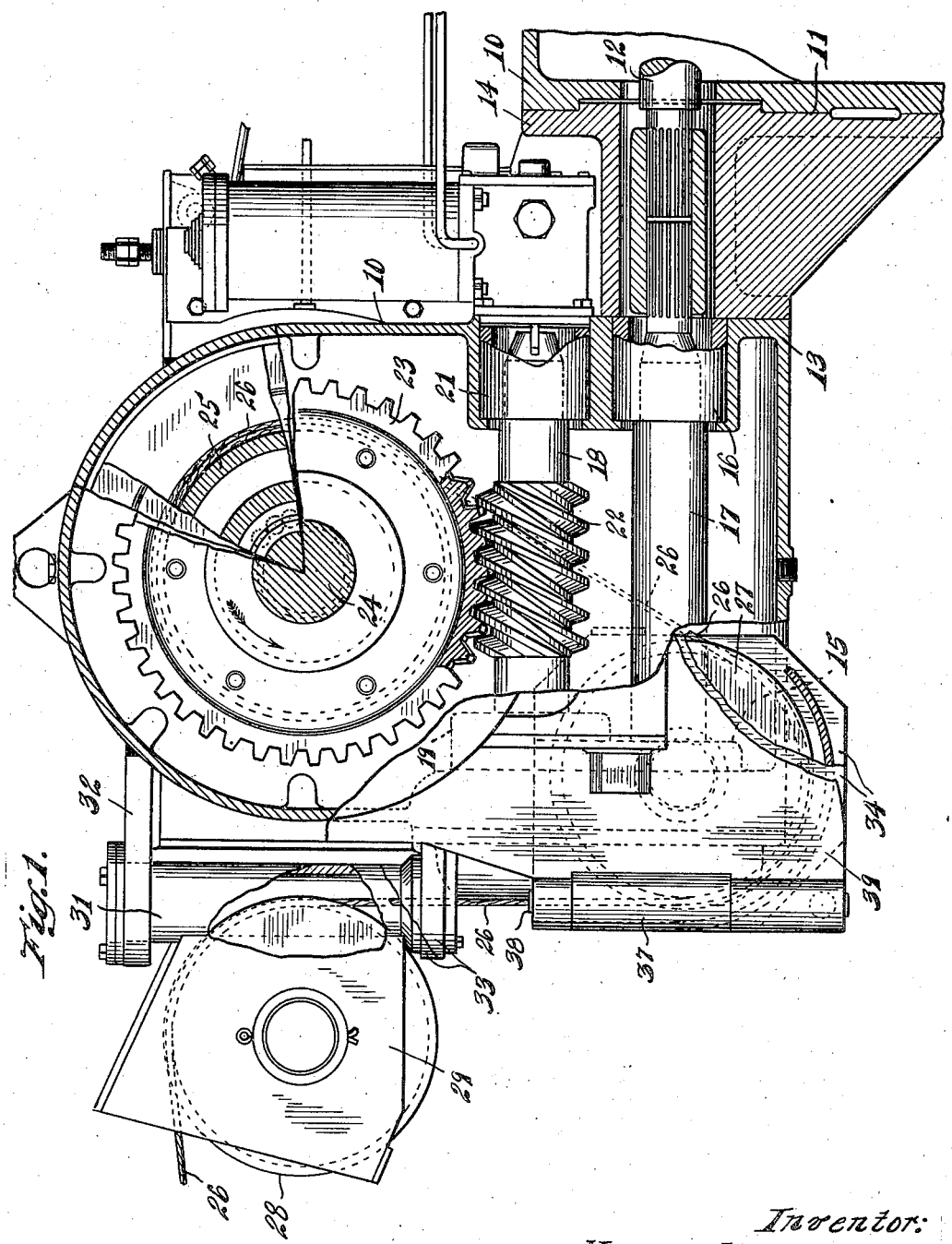
Inventor:
Harvey W. Rockwell.
By Bair & Freeman
Atty's.

Nov. 11, 1947.  H. W. ROCKWELL  2,430,618
FAIRLEAD CONSTRUCTION
Original Filed Jan. 20, 1945   2 Sheets-Sheet 2
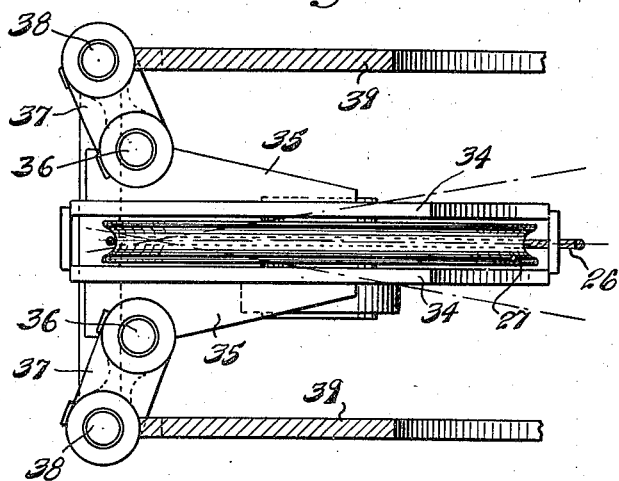
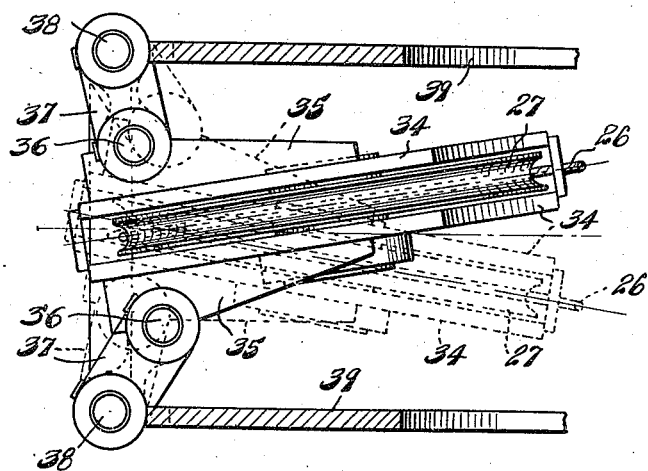
Inventor:
Harvey W. Rockwell.
By Bair & Freeman
Attys.

Patented Nov. 11, 1947

2,430,618

UNITED STATES PATENT OFFICE 2,430,618

FAIRLEAD CONSTRUCTION

Harvey W. Rockwell, Cedar Rapids, Iowa, assignor to La Plant-Choate Manufacturing Co., Inc., Cedar Rapids, Iowa, a corporation of Iowa Original application January 20, 1945, Serial No. 573,786. Divided and this application December 19, 1945, Serial No. 635,935

4 Claims. (Cl. 254—190)

This application relates to a fairlead construction particularly adaptable to earth moving apparatus and is a division of my copending application Ser. No. 573,786, filed January 20, 1945, for Control unit for wire rope.

It is an object of the invention to provide a novel reeving arrangement for wire rope in its passage from a carrier scraper or the like to the winding drum on a tractor.

It is another object of the invention to provide an improved pivoted fairlead construction for wire rope.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Fig. 1 is a vertical view, partially in section, showing the drive for the drum shaft, the pump of the unit driven from the power take-off shaft of the tractor and the fairlead construction for the wire rope cable associated with the cable operating unit.

Fig. 2 is an enlarged sectional view showing an idler sheave arrangement; and

Fig. 3 is a similar view showing the sheave in a shifted position, as when the wire rope is being wound adjacent the end of the drum as distinguished from the center thereof as shown in Fig. 2.

Referring specifically to the drawings for a detailed description of the invention, numeral 10 is a gear housing to be mounted on a tractor (not shown). The housing 10 has an attaching face 11 for various devices designed as accessories for the tractor. A power take-off shaft 12 is driven from the engine of the tractor and projects from the housing 10.

The wire rope control unit includes a frame or housing generally shown at 13, which has a flange 14 adapted to attach to face 11 by cap screws (not shown). Journalled in bearings 15 and 16 in the frame 13 is a drive shaft 17 suitably splined at one end with a splined end of the power take-off shaft 12. A worm shaft 18 is journalled in bearings 19 and 21 in the frame 10 and is driven through suitable gearing from the shaft 17. A worm 22 is formed or mounted on shaft 18 and meshes with a gear 23. The gear 23 is mounted on a shaft 24 which is journalled in suitable bearing in the frame 10. A drum 25 for cable 26 is rotated by the shaft 24. A combined clutch and brake is also provided but as this is shown and claimed in the aforesaid patent application, no further description is deemed necessary.

In accordance with this invention, I provide a pair of idler sheaves 27 and 28 for each drum 25. The sheave 28 is mounted between said plates 29 which are welded to a tube 31 rotatable in stationary brackets 32 and 33. The wire rope 26 extends over sheave 28 and down through tube 31 to the sheave 27 and then upwardly to wind on the drum 25, as shown in Figure 1. The tube 31 being rotatably mounted, permits the wire rope 26 to be shifted from side to side as the machine trailing the tractor assumes different positions caused by the tractor turning in response to its steering mechanism. This keeps the rope properly reeved on the sheave 28 at all times. The sheave 27 could be similarly swivelled but I prefer to use a different and novel construction due to limitations of space which construction will now be described.

Referring to Figures 2 and 3, the sheave 27 is journalled in side plates 34. Brackets 35 are preferably welded to the side plates 34 and carry pivot pins 36. Links 37 are pivoted to the pins 36 and on other pins 38. The pins 38 are supported by side plates 39 forming rigid parts of the frame 10. The linkage arrangement is such that the sheave 27 will pivot about a movable center point approximately coincident with the portion of the wire rope 26 which extends downwardly from sheave 28 to the sheave 27. This arrangement also eliminates any mechanism for pivoting the sheaves in the space back of the sheave, thus minimizing rearward projection of the unit.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a wire rope control unit of the character disclosed, a winding drum, a sheave arrangement for directing a wire rope or the like to the drum, including a sheave and means for pivotally mounting the sheave so that it floats in response to the direction of travel of the rope, said pivotal mounting means comprising a frame for the sheave and pivotally mounted links pivoted to the sides of the frame and extending substantially normal to the plane of the sheave, thereby permitting the sheave to pivot at a point substantially adjacent the travel of one stretch of the rope to the sheave.

2. In a rope control unit, a winding drum, a sheave for directing a rope or the like to the drum, and means for pivotally mounting said sheave so that it floats in response to the direction of travel of the rope, comprising a frame for the sheave, and pivotally mounted links pivoted to said frame and extending away therefrom to permit the sheave to pivot at a point substantially adjacent the travel of one stretch of the rope to the sheave.

3. In a rope control unit of the character disclosed, a winding drum, a sheave for directing a rope to the drum, and means for pivotally mounting said sheave comprising side plates for the sheave, links pivoted thereto and extending substantially normal to the plane of the sheave, said links having their outer ends pivoted to the frame of said unit and permitting the sheave to pivot at a point substantially adjacent the travel of one stretch of the rope to the sheave.

4. In a wire rope control unit, a winding drum, a sheave for directing a rope to the drum, and means for pivotally mounting said sheave so that it floats in response to the direction of travel of the rope, said means comprising a frame member and links pivotally secured to the sheave and the frame member.

HARVEY W. ROCKWELL.

REFERENCES CITED

The following references are of record in the file of this patent:

UNITED STATES PATENTS

| Number | Name | Date |
|---|---|---|
| 2,344,417 | Schmidt | Mar. 14, 1944 |
| 2,372,232 | Thornburg | Mar. 27, 1945 |
| 1,165,363 | Ruggles | Dec. 21, 1915 |